US011376693B2

(12) United States Patent
Verheyen et al.

(10) Patent No.: US 11,376,693 B2
(45) Date of Patent: Jul. 5, 2022

(54) APPARATUS WITH A MODULE FOR THE LAYERED MANUFACTURE OF A PRODUCT

(71) Applicant: 3D Systems, Inc., Rock Hill, SC (US)

(72) Inventors: Jozef Verheyen, Heverlee (BE);
Brawley Valkenborgs, Kessel-lo (BE);
Luc Cuyt, Oppuurs (BE); Jonas Van Vaerenbergh, Nieuwkerken-Waas (BE);
Filips Schillebeeckx, Bierbeek (BE)

(73) Assignee: 3D Systems, Inc., Rock Hill, SC (US)

( * ) Notice: Subject to any disclaimer, the term of this patent is extended or adjusted under 35 U.S.C. 154(b) by 341 days.

(21) Appl. No.: 16/001,578

(22) Filed: Jun. 6, 2018

(65) Prior Publication Data

US 2018/0345411 A1 Dec. 6, 2018

(30) Foreign Application Priority Data

Jun. 6, 2017 (BE) .................................. 2017/5405

(51) Int. Cl.
*B23K 26/342* (2014.01)
*B33Y 30/00* (2015.01)
(Continued)

(52) U.S. Cl.
CPC ............ *B23K 26/342* (2015.10); *B22F 12/00* (2021.01); *B23K 26/082* (2015.10); *B23K 26/083* (2013.01); *B23K 26/1464* (2013.01); *B23K 26/702* (2015.10); *B29C 64/153* (2017.08); *B29C 64/259* (2017.08); *B33Y 30/00* (2014.12); *B33Y 40/00* (2014.12); *B22F 10/10* (2021.01)

(58) Field of Classification Search
CPC ...... B22F 2003/1056; B22F 2003/1059; B22F 3/1055; B23K 26/082; B23K 26/083; B23K 26/1464; B23K 26/342; B23K 26/702; B29C 64/153; B29C 64/259; B33Y 30/00; B33Y 40/00
USPC ......... 219/76.1; 264/308, 497, 401, 85, 125, 264/126, 113; 425/174.4, 182, 375, 447; 156/272.8, 273.3, 275.5, 379.8, 381, 62.2
See application file for complete search history.

(56) References Cited

U.S. PATENT DOCUMENTS

| 2012/0052145 A1 | 3/2012 | Chen et al. |
| 2012/0243618 A1 | 9/2012 | Suh et al. |

(Continued)

FOREIGN PATENT DOCUMENTS

| DE | 102012014838 | 1/2014 |
| DE | 102015222689 | 5/2017 |

(Continued)

OTHER PUBLICATIONS

European Search Report and Written Opinion for EP 18176380.6 dated Oct. 12, 2018 (8 pages).

*Primary Examiner* — Helena Kosanovic
*Assistant Examiner* — Ket D Dang

(57) ABSTRACT

The invention relates to a system for the layered manufacture of a three-dimensional product starting from a powder, in particular a metal powder. More specifically, the invention relates to a system in which selective laser melting is applied to manufacture a product. Here, successive powder layers are covered by an energy beam, such as a laser beam, in order to melt the powder in this layer in whole or in part and subsequently to solidify or sinter it and to create successive layers of the product in this way.

27 Claims, 5 Drawing Sheets

(51) Int. Cl.
*B23K 26/70* (2014.01)
*B23K 26/08* (2014.01)
*B23K 26/14* (2014.01)
*B23K 26/082* (2014.01)
*B29C 64/153* (2017.01)
*B33Y 40/00* (2020.01)
*B29C 64/259* (2017.01)
*B22F 12/00* (2021.01)
*B22F 10/10* (2021.01)

(56) References Cited

U.S. PATENT DOCUMENTS

| | | | | |
|---|---|---|---|---|
| 2013/0108726 | A1* | 5/2013 | Uckelmann | B33Y 50/02 |
| | | | | 425/174.4 |
| 2015/0266239 | A1* | 9/2015 | Okamoto | B29C 64/214 |
| | | | | 428/413 |
| 2016/0339639 | A1* | 11/2016 | Chivel | B22F 3/1055 |
| 2018/0229301 | A1* | 8/2018 | De Pena | B22F 3/1055 |
| 2018/0370127 | A1* | 12/2018 | Paternoster | B29C 64/393 |
| 2019/0001413 | A1 | 1/2019 | Golz et al. | |
| 2019/0134705 | A1* | 5/2019 | Sheinman | B33Y 30/00 |

FOREIGN PATENT DOCUMENTS

| | | |
|---|---|---|
| EP | 1316408 | 6/2003 |
| EP | 3094476 | 11/2016 |
| WO | 2015071183 | 5/2015 |

\* cited by examiner

APPARATUS WITH A MODULE FOR THE LAYERED MANUFACTURE OF A PRODUCT

CROSS REFERENCE TO RELATED APPLICATIONS

This patent application claims priority to Belgium patent application serial number BE2017/5405, filed on Jun. 6, 2017, and incorporated herein by reference.

SUMMARY

This system has an apparatus with a build chamber in which said product is manufactured and scanning means to move said energy beam over the power layers. Said product is manufactured on a vertically movable horizontal build platform, where a powder dispenser is provided to apply the successive powder layers in a build surface on the build platform. Here, the powder dispenser can move back and forth over the build surface in a dispensing direction.

Moreover, the system contains at least an overflow tank with an opening that lets out onto said build surface for removal of powder from this build surface to the overflow tank and a reservoir intended for powder that is used to create said layers.

To transport powder from the reservoir vertically, a transport unit is provided.

These kinds of systems, for manufacturing a three-dimensional product based on materials such as a metal powder, are in themselves prior art. These systems are used in applications such as rapid prototyping techniques, such as Selective Laser Melting (SLM) or Selective Laser Sintering (SLS). Here, a virtual 3D model of the product to be manufactured is divided up into interconnecting layers. These layers are manufactured successively until the complete product has been built.

Document US 2004/0045941 describes a system with an exchangeable module that can be placed in a machine housing. This module contains a vertically movable build platform with a coater and a reservoir for powder. The machine housing is fitted with scanning means to move an energy beam over successive layers of powder.

Documents U.S. Pat. Nos. 5,846,370 and 6,554,600 describe an exchangeable module for an apparatus for layered manufacture of an object, where this module allows for cooling of the object, after its production, outside the apparatus, where a subsequent object can be manufactured in the apparatus concurrently using another module.

The invention seeks to offer a system that contains an exchangeable module with a reservoir containing powder to manufacture a product, where the apparatus also allows for collection of unmelted used powder. In addition, one goal of the invention is to develop a module that is simple to exchange and that has a relatively large build platform despite the fact that this module features a very small floor area. Due to the exchangeability of the module, it is possible to have a completed product cool off in one module while a second product is concurrently manufactured using another module.

To this end, said apparatus works in combination with a module that can be integrated into and removed from the build chamber, where the apparatus contains the powder dispenser, the transport unit and the scanning means, while said module contains the build platform, the overflow tank and the reservoir. Said reservoir features a powder line that can be connected to said transport unit.

For this purpose, the build platform extends above said reservoir.

Advantageously, said overflow tank lets out onto said reservoir.

Preferably, said module contains a coupling that is connected to the platform and that can be connected to the drive means of said apparatus, where these drive means enable vertical movement of said platform by means of this coupling.

According to a preferred embodiment of the system, according to the invention, said transport unit is provided to transport powder from said reservoir to a screening device that contains a screen to separate this powder into a production fraction, which is suitable for the manufacture of said product, and a rejected fraction.

Advantageously, said screen is mounted over a hopper so that said production fraction is collected in this hopper.

According to a specific embodiment of the system, according to the invention, said hopper is fitted with a dosing valve to move a quantity of powder to the powder dispenser.

The invention also relates to a module for use in an apparatus for layered manufacture of a three-dimensional product based on a powder. This apparatus has a transport unit to transport said powder vertically and features a build chamber where a powder dispenser is located for application of successive powder layers. Moreover, the apparatus also contains scanning means to enable movement of an energy beam over said powder layers.

This module must be placed in the build chamber of the apparatus and features a vertical tube with a top edge that extends into a horizontal build surface, where a vertically movable build platform is provided in this tube. An overflow tank features an opening that lets out onto said build surface for removal of powder from this build surface to the overflow tank. This module also contains a reservoir intended for powder that is used to create said layers, where this reservoir extends under said platform and has a powder line that can be connected to the powder transport unit of the apparatus.

BRIEF DESCRIPTION OF FIGURES

Further details and advantages of the invention shall be indicated in the below description of some specific embodiments of the system and module, according to the invention. This description is only given as an example and does not restrict the scope of the protection claimed; the reference numerals used below pertain to the appended figures.

In the various figures, the same reference numerals pertain to the same or analogous members.

DETAILED DESCRIPTION OF THE PREFERRED EMBODIMENTS

Figures 1, 2, 3, 4:
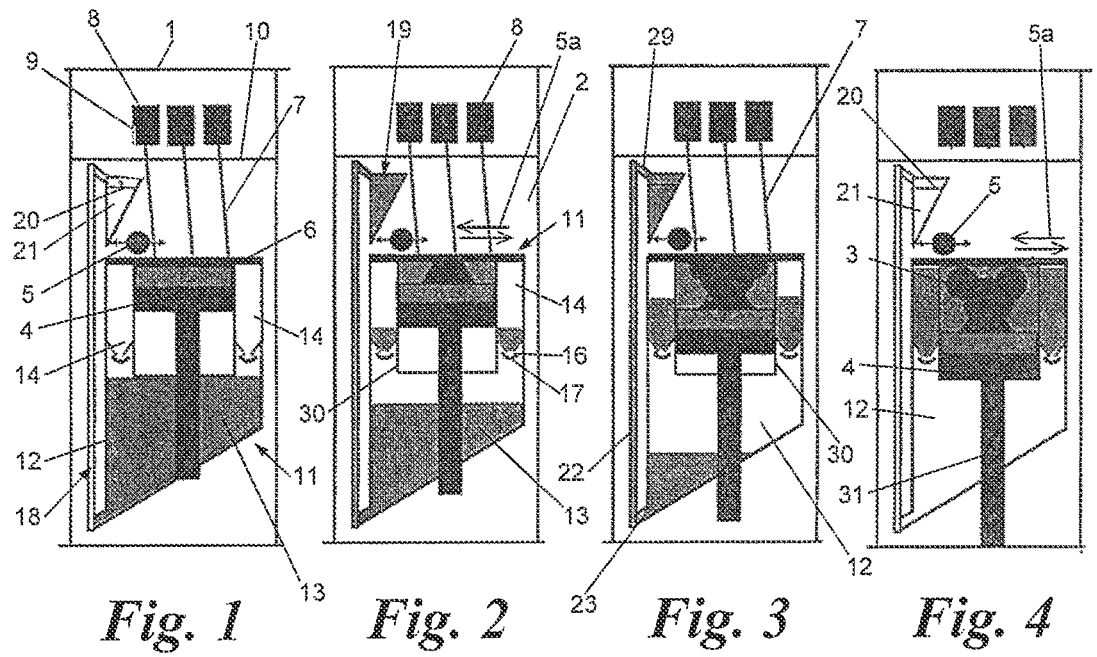
FIG. 1 shows a schematic vertical cross-section of an apparatus with a module, according to the invention, with a build platform in a start position at the start of manufacture of a product by additive laser melting.
FIG. 2 is the same cross-section from FIG. 1, with the build platform in a first intermediate position, where a product has already been partly manufactured.
FIG. 3 is the same cross-section from FIGS. 1 and 2, with the build platform in a second intermediate position, where manufacture of the product has progressed further.
FIG. 4 is the same cross-section as the one from FIGS. 1 to 3, when the manufacture of the product ends and the build platform is located in final position.
Figure 5:
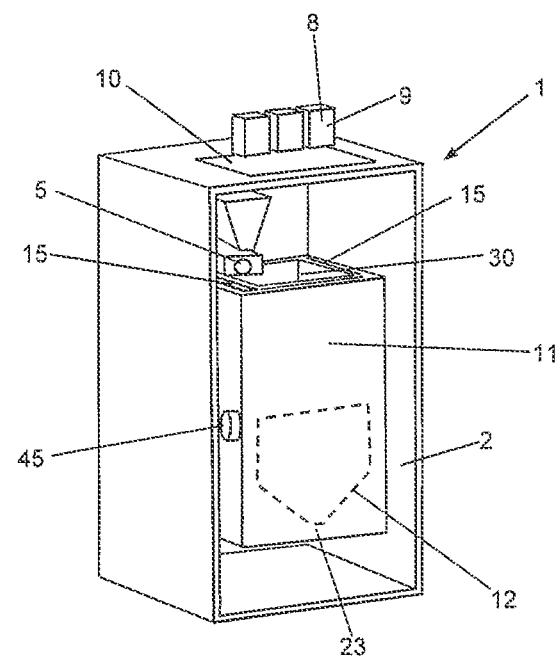
FIG. 5 is a schematic perspective image of an apparatus, according to the invention, in which a removable module has been placed in a build chamber of the apparatus.

The invention relates to a system for production of one or more products by an additive manufacturing technique, where this product is built in layers. For this, successive layers of raw materials in powder form are applied for this product in a build surface, where one or more energy beams scan over these successive layers according to a predetermined pattern in order to create successive cross-sections of the object.

The invention may be applied in machines for various types of additive manufacturing techniques, such as selective laser sintering, selective laser melting or electron beam melting. By way of example, this description will refer to an additive manufacturing technique that uses a laser beam, in particular selective laser melting, but of course other types of energy beams may be applied, such as electrode beams.

FIGS. 1 to 14 show diagrams of a preferred embodiment of the system, according to the invention, where FIGS. 1 to 4 and 6 are schematic principle drawings. This system contains an apparatus 1 in which a closable build chamber 2 is provided. In this build chamber 2, one or more products 3 are manufactured by a technique such as selective laser melting.

As shown in the diagrams in FIGS. 1 to 4, the system contains a vertically movable build platform 4 on which one or more products 3 can be manufactured. For this, a powder dispenser 5 is provided that is located in said build chamber 2 and that enables application of successive powder layers in a horizontal build surface 6 on the build platform 4.

This kind of powder dispenser 5 in itself is prior art and can be moved in a dispensing direction 5a in a back and forth motion over the build surface 6. When the powder dispenser 5 moves over the build platform 4 in this manner, a powder layer is applied in the build surface 6.

After application of this powder layer, an energy beam 7 is moved over the powder layer in order to melt powder and then solidify it according to a predetermined pattern that corresponds to a cross-section of the product 3. This creates a thin layer of the product 3. The build platform 4 is then moved downwards on a vertical path over a height that corresponds to the thickness of a powder layer, so that a subsequent powder layer can be applied over the platform 4 in the build surface 6 using the powder dispenser 5 to manufacture a subsequent cross-section of the product 3. These steps are repeated until the complete product 3 has been created.

In the embodiment of the system, according to the invention, which is shown in the figures, three energy beams 7 are moved over the successive powder layers to create the product 3. Each of these energy beams 7 are preferably made up of a laser beam that is generated by a corresponding laser source provided for this and that strikes the successive powder layers in this manner. The use of multiple energy beams 7 enables, on the one hand, the manufacture of relatively large products 3 and, on the other hand, an increase in the build speed for a product 3. Of course it is possible to provide an apparatus where only one energy beam 7 is moved over the successive powder layers to manufacture one or more products 3.

In addition, for each of the energy beams 7, the system features scanning means 9 that enable movement of the beams 7 over the successive powder layers so that the point of incidence of the beam moves over the relevant powder layer according to said pattern. Said scanning means 9 comprise one or more galvanometers, for instance.

The laser sources 8 and corresponding scanning means 9 are mounted outside of the build chamber 2. The top of the build chamber 2 is fitted with at least a transparent window 10 that is penetrable for said energy beams 7 so that they can pass through this window 10 and strike the successive powder layers that extend into the build chamber 2 in said build surface 6.

As shown in FIGS. 1 to 6 for instance, the build chamber 2 accommodates a module 11 that contains said build platform 4. This module 11 can be removed from the build chamber 2 and is simple to exchange with an identical module.

Said build platform 4 is part of the module 11 and is vertically movable in this module, as indicated in FIGS. 1 to 4. Under the build platform 4, the module 11 is fitted with a reservoir 12 that is intended to hold powder 13 for use in creating said successive powder layers and from which said products 3 will be manufactured.

Moreover, the module 11 defines said build surface 6, where the part of this build surface 6 that extends above the building platform 4 forms a build zone in which said successive cross-sections of the manufactured products 3 are created.

Module 11 has at least an overflow tank 14 featuring an opening 15 that lets out onto said build surface 6. When powder is dispersed in this manner with said powder dispenser 5 in the build surface 6 in order to create a powder layer, excess powder, during movement of the powder dispenser 5, is guided to said opening 15 of the overflow tank 14 and collected therein. More specifically, in the embodiment of the module shown in the figures, such as in FIGS. 8 and 10, an overflow tank 14 that lets out onto the build surface 6 next to the build zone via an elongated opening 15 is provided along both sides of the build platform 4. These openings 15 each form a groove that extends over practically the entire width of the build platform 4 and transverse to said dispensing direction 5a of the powder dispenser 5. In this way, excess powder that is located outside of the build zone, for instance, is guided to an opening 15—by the movement of the powder dispenser 5 in the dispensing direction 5a—through which this excess powder flows to the corresponding overflow tank 14.

Preferably, both overflow tanks 14 let out into said reservoir 12 through openings 16 in the bottoms of these tanks. This lets excess powder from said build surface 6 flow back to the reservoir 12 for reuse in the manufacture of a product 3. According to the embodiment of the module 11 shown in the figures, said opening 16 can be closed, which means this is fitted with closing means 17. Thus, the closing means 17 can keep used powder separate from fresh powder that is present in the reservoir 12.

The system is further fitted with a transport unit 18 to transfer powder from said reservoir 12 to the powder dispenser 5 when the module 11 is located in the build chamber 2. Preferably, this transport unit 18 extends at least part way into the build chamber 2 of the apparatus 1, thus enabling vertical transport of the powder 13 from the reservoir 12.

In the embodiment of the apparatus, according to the invention, shown in the figures, a screening device 19, with a screen 20 and a hopper 21, is provided between the transport device 18 and the powder dispenser 5.

In this way, powder is transported upwards vertically by the transport unit 18 from the reservoir 12 and thus ends up in the screening device 19 that works in combination with said powder dispenser 5. More specifically, the screening device 19 enables separation of supplied powder 13, with the screen 20, into a production fraction, suitable for manufacture of said product 3, and a rejected fraction.

This production fraction falls through the mesh of the screen 20 and into said hopper 21 that extends practically over the entire width of said build platform 4, or over the length of the powder dispenser 5, transverse to said dispensing direction 5a. Over its length, this hopper 21 has a dosing valve on its bottom that extends above the powder dispenser 5 when the latter is placed under the hopper 21. Thus, the dosing valve allows powder to flow from the hopper 21 to the powder dispenser 5 when the latter is positioned below the dosing valve.

Said screen 20 is preferably somewhat inclined with respect to a horizontal plane and may be subject to a vibration such that powder that does not fall through the mesh of the screen 20, and which is thus part of said rejected fraction, is moved over the surface of the screen 20 to a discharge pipe.

As shown in the diagrams in FIGS. 1 to 4, 6 and 14, the transport unit 18 contains a vertical pipe 22 that extends from under the reservoir 12 to above the level of the hopper 21 and the screen 20 next to module 11, when the latter is mounted in the build chamber 2.

Figure 10:
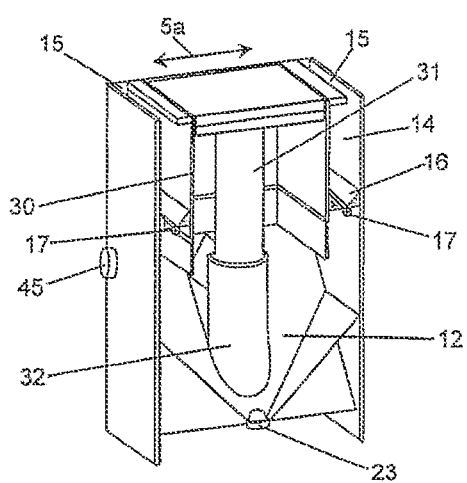
FIG. 10 is a schematic perspective view of a vertical cross-section along vertical plane X-X of the module from FIG. 7, where the build platform is located in a start position.
Figure 13:
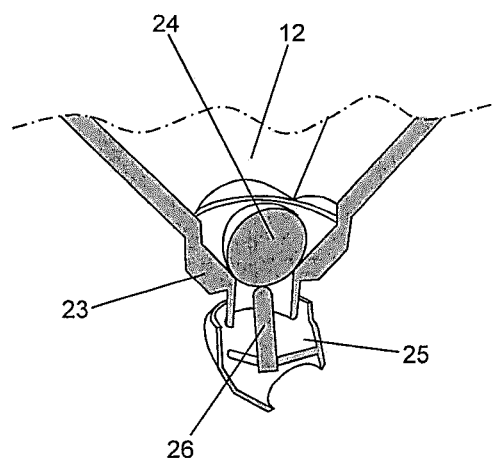
FIG. 13 is a perspective view of a vertical cross-section of a powder line with a shut-off valve on the bottom of the reservoir of the module.

The reservoir 12 of the module 11 has a floor made up of one or more sloped surfaces that converge at the bottom end of the reservoir 12 at a powder line 23, as shown in the diagrams in FIGS. 10 and 13, for instance. In the embodiment of the module 11 shown in these figures, the powder line 23 takes the form of a truncated cone whose diameter tapers off towards the bottom in the vertical direction and thus lets out onto a circular opening. A spherical ball 24, with a diameter that its greater than the circular opening, rests in this truncated cone. Thus, this ball 24 closes the powder line 23 because the ball 24 connects to the perimeter of the circular opening under the influence of gravity.

Figure 14:
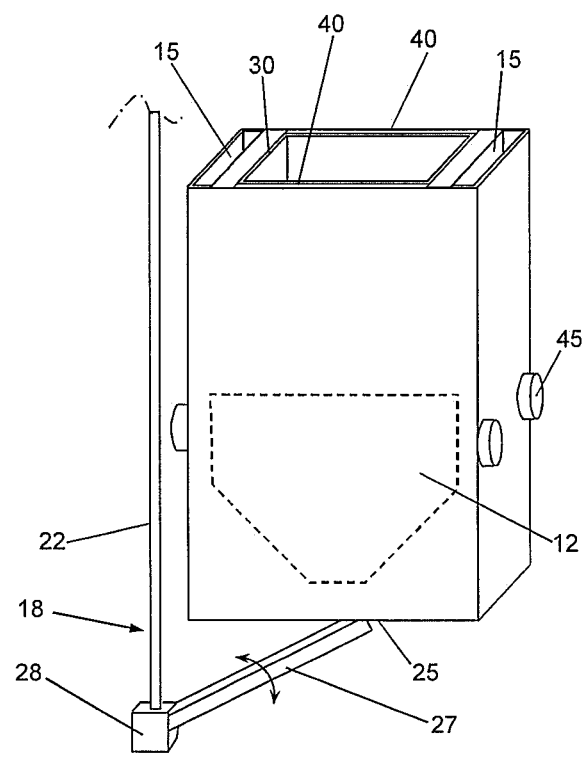
FIG. 14 is a schematic perspective image of the module when the powder line of the module is linked to the transport unit.

When the module 11 is placed in the build chamber 2 and is connected to the apparatus 1 of the system, the powder line 23 come into contact with said transport unit 18 and thus also connects with it, as shown in the diagrams in FIGS. 13 and 14.

For this, the transport device 18 is fitted out with an adapter 25 that is made up of a socket from which a pin 26 extends in a centered position. The adapter 25 is mounted to the top end of a vibrating chute 27 whose opposite and bottom end is attached in the build chamber 2 by a hinge.

In order to connect the transport unit 18 to the powder line 23 when the module 11 is placed in the build chamber 2, the vibrating chute 27 rotates around said bottom end until the socket of the adapter 25 closes around the circular opening of the powder line, as shown in FIGS. 13 and 14. In this case, the vibrating chute 27 is inclined with respect to a horizontal plane. Said pin 26 thus presses against the ball 24 so that the latter is moved upwards and a slit arises between the ball 24 and the edge of the circular opening, through which powder 13 can flow out from the reservoir 12. In this case, this powder flows through the socket of the adapter 25 to the vibrating chute 27.

Due to the incline of the vibrating chute 27 and a vibration to which this is subject, the powder flows from the adapter 25 at the top end of the vibrating chute 27 to its bottom end until it flows into a powder tank 28. The bottom end of the vertical pipe 22 of the transport unit 18 lets out into this powder tank 28. In the vicinity of the top end of this pipe 22, a discharge pipe 29 is provided, as shown in FIGS. 1 to 4, which allows powder to flow from the pipe 22 to said screening device 19. As previously described above, this discharge pipe 29 lets out onto a screen 20 that separates the supplied powder into a rejected fraction and a production fraction. In order to move the powder into said pipe 22, an Archimedes screw, for instance, extends into it, which is subject to rotation around its axis.

Of course it is also possible to apply means of transport other than those described here to move the powder from the reservoir 12 to the screening device 19. Thus, for instance, pneumatic transport may be applied, where the powder is moved under the influence of an overpressure or an underpressure that is created.

Moreover, a vertical tube 30 is provided in the module 11, whose top edge extends into said build surface 6. The build platform 4 is mounted in this tube 30 in such a way that the tube 30 connects to the perimeter of the build platform 4 almost exactly in order to prevent powder from flowing out between the perimeter of the platform 4 and the tube 30. Preferably, a seal is applied here between the tube 30 and the build platform 4. This seal is created, for instance, by a rubber or felt strip that is fixed to the edge of platform 4 and thus extends along its perimeter.

The build platform 4 is vertically movable in the tube 30 between a start position, where the top surface of the platform 4 extends into said build surface 6 or to a short distance under this build surface 6, and a final position located below this start position. Said short distance corresponds to the height of a single powder layer, for instance.

Figure 11:
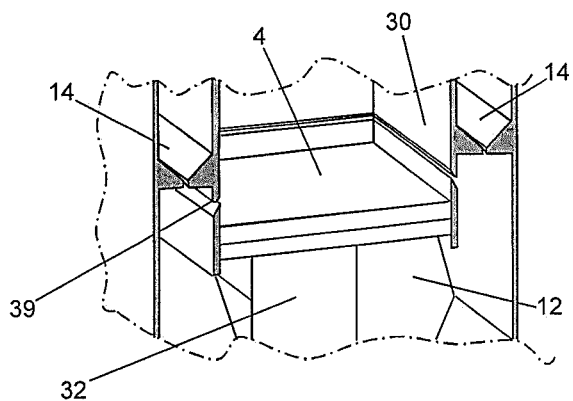
FIG. 11 is a detail of FIG. 10 with the build platform in the final position.

FIGS. 1, 7, 8, 10 and 12 show the build platform 4 in the start position while FIGS. 4 and 11 show the platform 4 in the final position.

In the embodiment of the module 11 shown in the figures, the build platform 4 has the form of a rectangle, so that the tube 30 exhibits a corresponding rectangular cross-section. Of course, build platform 4 is not necessarily rectangular and may also take on other shapes. For instance, it may feature an elliptical or circular perimeter.

As shown in the diagrams in FIGS. 7 to 10, the build platform 4 is mounted to the top end of a vertical cylindrical arm 31. This arm 31 is vertically movable and, for this, is guided through a concentric cylinder 32 that connects to the bottom of the reservoir 12. More specifically, the cylinder 32 borders an opening that is provided in the bottom of the reservoir 12, through which said arm 31 may be moved vertically. Preferably, the cylinder 32 extends up to above the level of the powder 13 in the reservoir 12 or up to practically at the bottom of the platform 4 when this is located in the indicated final position. Thus, this prevents powder 13 from flowing between the arm 31 and the cylinder 32.

The bottom end of said vertical arm 31 is attached to a horizontal arm 33 that extends up to the outer wall of the module 11 where the arm 33 is fixed to a coupling plate 34. This coupling plate 34 is vertically movable, where this is guided by two vertical guide rails 35 and 36 provided in said outer wall. For this, the side of the coupling plate 34 turned towards this wall features corresponding sliders 37 that are guided by the guide rails 35 and 36.

The coupling plate 34 is fitted with a protrusion 38 that forms a coupling to connect the module 11 to the apparatus 1. More specifically, this coupling can be connected to the drive means of said apparatus 1 that can be moved along a vertical axis. Thus, these drive means enable vertical movement, via this coupling, of the entire unit comprising said coupling plate 34, the horizontal arm 33 and the vertical arm 31 together with the build platform 4. Here, this integral unit is guided, on the one hand, over said guide rails 35 and 36 and, on the other hand, by said cylinder 32. Here, the arm 33 extends through a vertical recess provided for this purpose in the side wall of the cylinder 32.

Moreover, between said start position and said final position, and in the vicinity of the latter, the tube 30 has at least a closable opening 39 that lets out onto said reservoir 12 and that enables powder to flow from the tube 30 to the reservoir 12. More specifically, the tube 30 is made up of two vertically interconnected parts, where said closable opening 39 extends between these parts. These parts are movable along the vertical axis with respect to one another such that said opening 39 is created by the parts moving apart from one another and is closed by these parts moving together until they connect.

Said opening 39 therefore extends on a horizontal plane at a short distance above the build platform 4 when the latter is in said final position, as shown in FIG. 11. Thus, this opening 39 allows powder to flow from the tube 30 to the reservoir 12 when manufacture of the product 3 has ended in order to release this product. Thus, this powder may be used to manufacture another product 3.

According to an alternative embodiment, the tube 30 has a fixed opening 39 between said parts and these parts of the tube 30 cannot move with respect to one another. In order to allow powder from the tube 30 to flow through this opening 39 to the reservoir 12, the platform 4 is moved to under the opening 39. The opening 39 is therefore closed for the powder when the platform 4 is located above it.

Said opening 39 is not necessarily present, so that the tube 30 is made of just one part. Once manufacture of a product is complete, then, for instance, the platform 4 can be moved to the start position or possibly higher so that powder from the platform can flow to the openings 15 of the overflow tanks 14. Alternatively, the build platform 4 may also be moved to under the tube 30 in order to let the powder flow directly to the reservoir 12.

Said module 11 may contain an overflow groove 40 along both sides of said build zone, which extends practically in parallel to the dispensing direction 5a and transverse to the elongated openings 15 of the overflow tank 14. These overflow grooves 40 extend, more specifically, into the build surface 6 and are connected with the overflow tanks 14 such that powder that is fed by the powder dispenser 5 to these grooves 40 flows to the overflow tanks 14.

Figure 12:
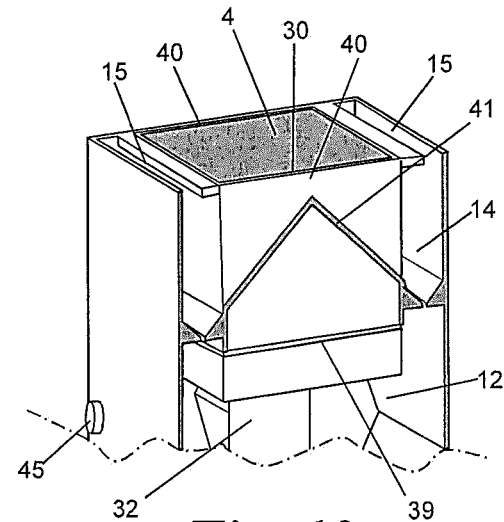
FIG. 12 is a schematic perspective view of a vertical cross-section along vertical plane XII-XII of the module from FIG. 7, where the build platform is located in a start position.

As shown in FIG. 12, the overflow groove 40 lets out onto a space that is bordered at the side by a tube 30 and a wall of the module 11. On the bottom, this space is bordered by a profile 41 in the form of an upside-down V which ensures that powder entering this space from the overflow groove 40 is removed to said overflow tanks 14.

Figure 6:
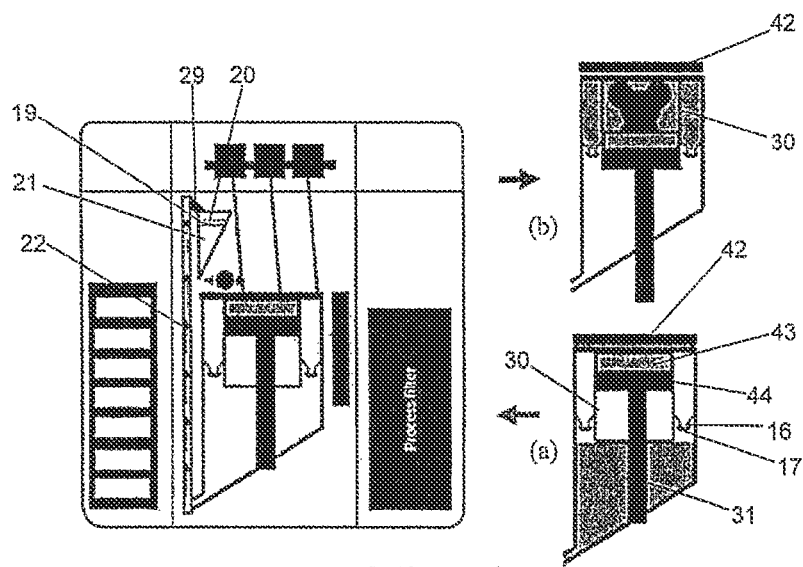
FIG. 6 shows a schematic vertical cross-section for an apparatus, according to the invention, where a module (a) is shown that was provided to carry out the manufacture of a product and a module (b) in which a product is located after its manufacture.
Figure 7:
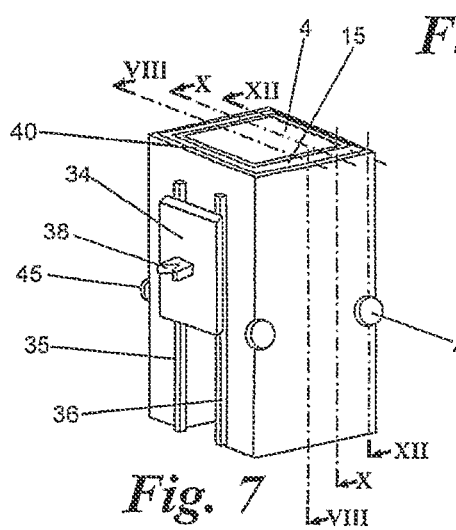
FIG. 7 is a schematic perspective image of a module, according to the invention.
Figure 8:
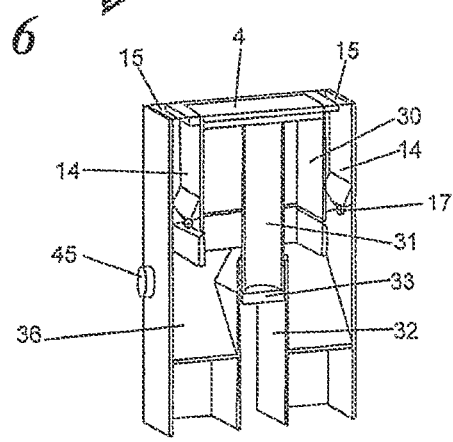
FIG. 8 is a schematic vertical cross-section along vertical plane VIII-VIII of the module from FIG. 7.
Figure 9:
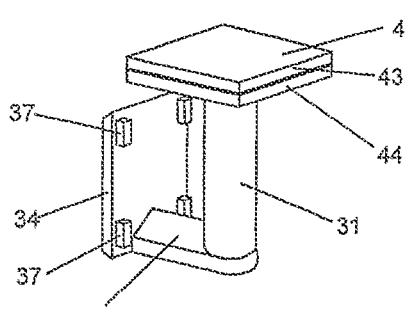
FIG. 9 is a perspective image of the build platform of the module fitted with a coupling.

The module 11 is further fitted with a cover 42 that is shown in the diagram in FIG. 6 and that allows closure of the top of the module 11 when, after manufacture of a product 3, the build platform 4 is moved to said final position. Thus, FIG. 6 shows two modules (a) and (b) that are located outside of the apparatus 1 and that are sealed with a cover 42.

To manufacture one or more products 3 with the system, according to the invention, a module 11 with a reservoir 12 that contains enough powder 13 to manufacture the products 3 is moved into the build chamber 2 of the apparatus 1 as shown in the diagram in FIGS. 6 and 1.

Here, the build platform 4 is made up of a build plate 43 that rests on a base plate 44. The two plates are of practically the same size, where the base plate 44 is fixed to said vertical arm 31. Said seal that is provided between the vertical tube 30 and the platform 4 is fixed to the edge of this base plate 44.

When the module 11 is placed in the build chamber 2, this rests on corresponding support rails in the build chamber 2 with support wheels 45 provided for this. The support wheels 45 are mounted to two opposing side walls of the module 11 so that they are suspended from the support rails by these support wheels 45. These support rails are not shown in the figures.

Thus, when the module 11 is placed in the apparatus, said protrusion 38 from the coupling plate 34 is connected to the drive means of the device. These drive means therefore allow the coupling plate 34, along with the build platform 4, to move on the vertical axis after the module 11 is placed in the apparatus.

The apparatus 1 is fitted with a door, not shown in the figures, which allows hermetic sealing of the build chamber 2 once the module 11 has been placed in it. Once the build chamber 2 is closed in this way, it can be placed under a controlled atmosphere, filled with an inert gas or placed under a vacuum, for instance, before starting the manufacture of a product 3.

Moreover, the vibrating chute 27 is moved from a practically horizontal position to an inclined position, where the adapter 25 is moved up to the powder line 23 of the reservoir 12. Here, the pin 26 presses the spherical ball 24 upwards a short distance such that powder 13 from the reservoir 12 can flow to the vibrating chute 27.

By driving the vibrating chute 27, the powder 13 is then moved to the powder tank 28, from where it is moved upwards vertically through the tube 22. At the top of this tube 22, the powder is guided through a discharge pipe 29 to the screening device 19, and the screen 20 ensures that the powder that is not suitable for production of a product 3 is separated out. The powder that is suitable for manufacture of the product falls through the mesh of the screen 20 and constitutes the production fraction that ends up in the hopper 21 of the apparatus 1.

The hopper 21 works in combination with the powder dispenser 5 which is horizontally movable in the dispensing direction 5a above the module 11, in particular above its build platform 4. The powder dispenser 5 extends over practically the entire width of the build platform 4, transverse to said dispensing direction 5a.

The powder has two compartments for application of successive layers of powder. Thus, the powder dispenser 5 is placed under the hopper 21 and each compartment is filled, by means of said dosing valve, with a quantity of powder that corresponds to a powder layer. Subsequently, the powder dispenser 5 is moved over the build platform 4 along said dispensing direction 5a in order to apply a powder layer in the build surface 6 and dispense it over the build zone. Here, powder that ends up outside the build zone flows through said overflow openings 15 or through said overflow grooves 40 to the overflow tanks 14.

After application of a powder layer of this kind, at least a laser beam 7 originating from a corresponding laser source 8 is moved over the powder layer. Here, the laser beam 7 is controlled by the scanning means 9 so that the point of incidence of the laser beam 7 is moved onto the powder layer to obtain a cross-section of the product 3 being manufactured.

Next, a subsequent powder layer is applied by moving the powder dispenser 5 in the opposite direction over the build zone up to under the hopper 21 in order to refill the compartments of the powder dispenser 5 with powder. In the meantime, said laser beam 7 is reactivated and the scanning means 9 move it over the last powder layer applied in order to manufacture a subsequent contiguous cross-section of the product 3.

In this way, successive cross-sections of the product 3 are manufactured as shown in the diagrams in FIGS. 1 to 4.

Thus, once all successive cross-sections of the product 3 have been manufactured, practically all powder 13 from the reservoir 12 is moved to the space in the tube 30 above the build platform 4 and to said overflow tanks 14, as shown in the diagram in FIG. 4. Preferably, said reservoir 12 contains excess powder 13, so that after the end of manufacture of the product 3, a quantity of powder may still be present in the reservoir 12 or in the hopper 21.

Before opening the build chamber 2 and before removal of the module 11 from the build chamber 2 after manufacture of the product 3, the cover 42 of the module 11 is placed on its top, as shown at top right in the diagram in FIG. 6. This cover 42 ensures that the powder that is located in the module 11 is protected from the environment so that after removal of the module 11 from the build chamber 2, the powder remains free of impurities. Preferably, the cover 42 hermetically seals off the contents of the module 11 from the environment.

In order to close off the powder line 23, the adapter 25 along with the vibrating chute 27 are moved downwards so that the pin 26 no longer exerts pressure on the ball 24. Here, under the influence of gravity, the ball 24 moves downwards until it contacts the circular opening of the powder line 23 so that this opening, and thus also the powder line 23, is closed by the ball 24.

Once the cover 42 has been placed on the module 11 in this way and the powder line 23 has been closed, the pressure in the build chamber 2 is adjusted so that it is practically the same as the pressure outside of the apparatus 1. Next, the door of the build chamber 2 is opened and the module 11 is detached from the drive means and removed from the build chamber 2.

As shown in the diagram in FIG. 6, immediately after a module with a product 3 has been removed from the build chamber 2, a new module 11 with a reservoir 12 containing a fresh supply of powder 13 is placed in the build chamber 2 and connected to the apparatus 1.

Figure 15:
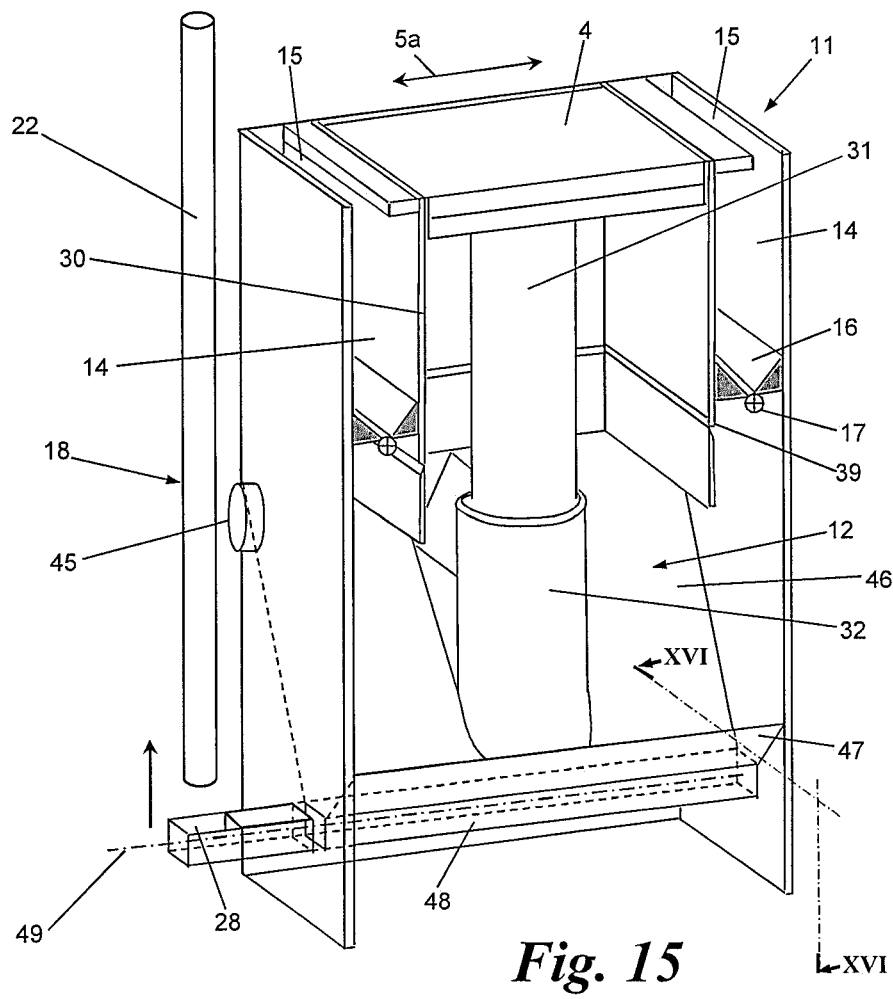
FIG. 15 is a schematic perspective view of an alternative embodiment of the module, according to the invention, of a vertical cross-section along vertical plane X-X of the module from FIG. 7, where the build platform is located in a start position, shown on a larger scale.
Figure 16:
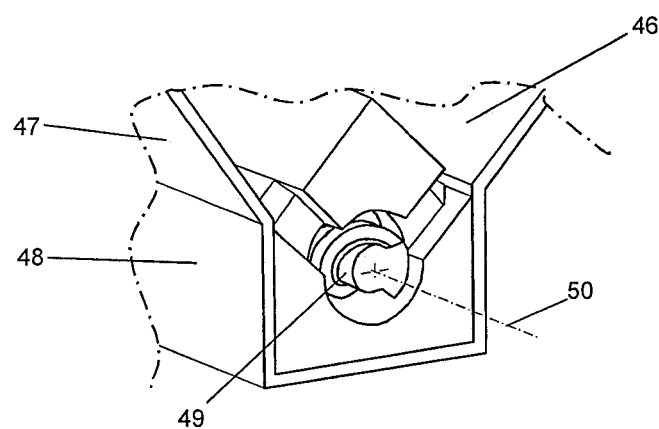
FIG. 16 is a schematic perspective view of a vertical cross-section along vertical plane XVI-XVI of an Archimedes screw in the module from FIG. 15.
Figure 17:
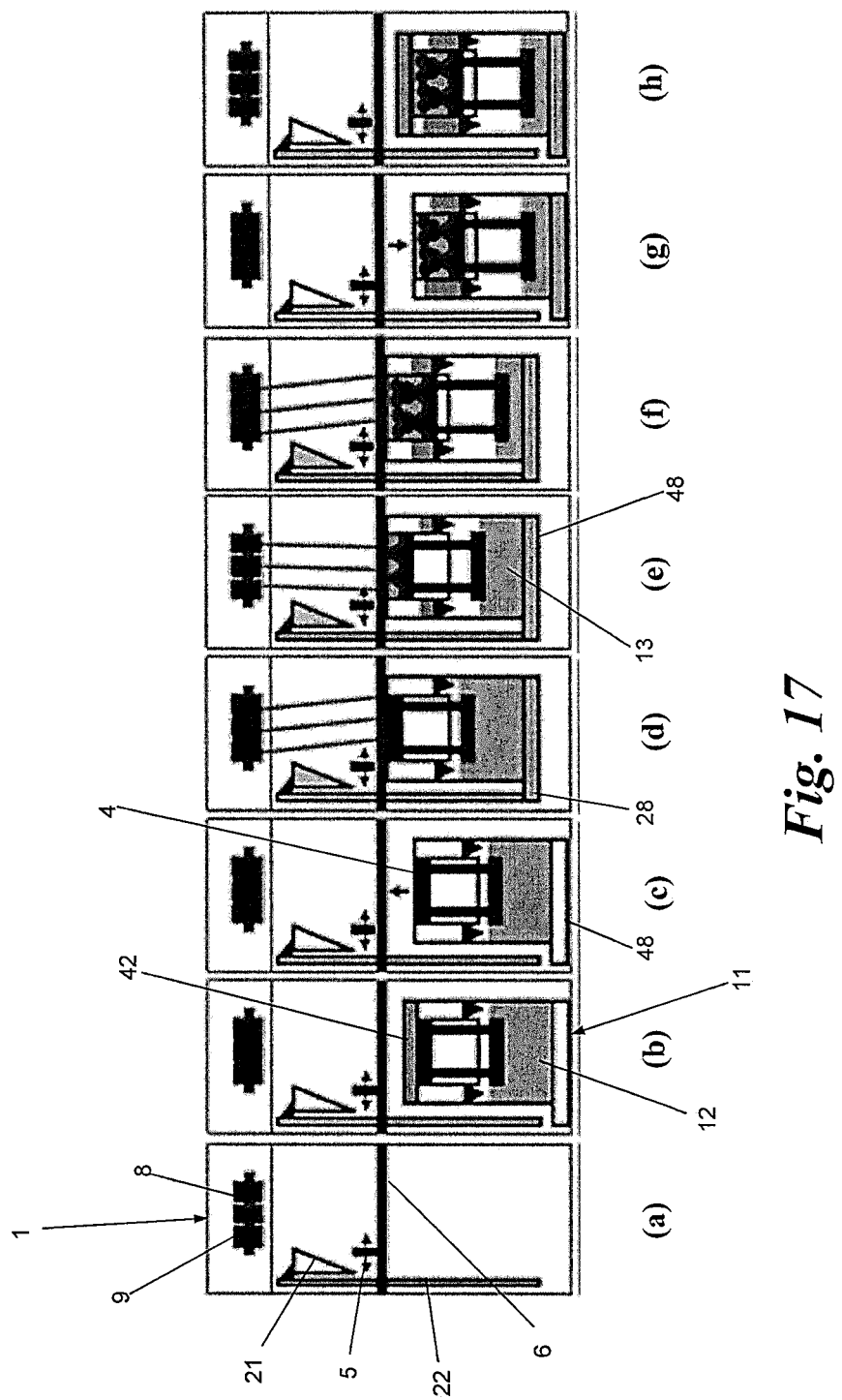
FIG. 17 is a schematic view of the apparatus, according to the invention, showing successive production steps.

FIGS. 15 to 17 show an alternative embodiment of the module, according to the invention. This module 11 is different from the module described above because the reservoir 12 is bordered on the bottom by two plates 46 and 47 sloping towards one another which let out onto their parallel bottom edge and connect to a practically horizontal powder chute 48. Powder that ends up in the reservoir 12 in this manner flows along these plates 46 and 47 to the powder chute 48. The powder chute 48 extends over the complete width of the reservoir 12, where one of its ends protrudes through the wall of the module and lets out on a powder tank 28.

An Archimedes screw 49 extends with a center axis 50 into the powder chute 48 and along its longitudinal axis. For clarity in FIG. 15, this figure only shows the axis 50 of the Archimedes screw 49. This Archimedes screw 49 enables movement of powder in the powder chute 48 to the powder tank 28. Here, the Archimedes screw 49 preferably extends to just before the powder tank 28.

This powder chute 48, along with the connecting powder tank 28, forms a powder line 23 to connect the module 11 to the transport unit 18 of the system.

At the end of the Archimedes screw 49 opposite the powder tank 28, the former is fitted out for connection with a drive unit to drive rotation around its axis 50. This drive unit may be present in the module, but may also be provided on said apparatus 1, where the Archimedes screw 49 is coupled to the drive unit when the module 11 is positioned in the apparatus.

FIG. 17, images (a) to (h), shows the apparatus 1 in successive steps in the manufacture of a product 3 with use of the module from FIG. 15.

FIG. 17(a) depicts the apparatus before a module 11 is positioned in the build chamber 2. Next, a module 11 is placed in the build chamber 2 of the apparatus 1 as shown in FIG. 17(b), where the reservoir 12 is filled with powder 13 and the module 11 is closed on the top with a cover 42. The build chamber 2 is then closed off and the cover 42 is automatically removed from the module 11. As shown in FIG. 17(c), the module 11 can then be moved vertically upwards and positioned therein in order to couple it to the apparatus 1 using the coupling plate 34, where the bottom end of the tube 22 of the transport unit 18 is connected to the powder tank 28, as shown in FIG. 17(d).

FIGS. 17(e) and 17(f) show the successive steps for the manufacture of the product 3, where the build platform 4 is gradually moved from the start position to the final position.

Once the manufacture of the product 3 is complete, the module 11 is moved back down into the build chamber 2 in order to detach it from the apparatus 1 as shown in FIG. 17(g) and the cover 42 is placed on the module 11, which is shown in FIG. 17(h).

Next, the build chamber 2 can be opened and the module 11 can be removed so that the apparatus is back in the state as in FIG. 17(a) for receipt of a new module 11.

The use of the module 11 with a powder chute 48 that connects to the powder tank 28 offers the advantage that when decoupling the module 11 from the apparatus, all powder is removed from the transport unit 18. After all, under the influence of gravity, the powder that is present in the tube 22 flows down, preferably into the powder tank 28. It is also possible to reverse the direction of rotation of the Archimedes screw 49 so that powder that is present in the transport unit 18 flows back into the reservoir 12.

The invention is of course not limited to the embodiments of the system, apparatus or module described above. Thus, for instance, it is not necessary for the powder dispenser to be fixed to the apparatus 1: it may also be provided on the module 11 itself, according to a different embodiment. More specifically, the powder dispenser 5 can be integrated into the module 11 along with its corresponding drive unit.

What is claimed:

1. A system for layered manufacture of a three-dimensional product based on a powder, where successive powder layers are covered by an energy beam in order to melt the successive powder layers in whole or in part and subsequently to solidify or sinter the successive powder layers to create contiguous interconnected layers of the three-dimensional product, with
    an apparatus that contains a build chamber in which said product is manufactured,
    a vertically movable build platform,
    a powder dispenser for application of said successive powder layers on the build platform in a build surface the powder dispenser is configured to be moved back and forth over the build surface along a dispensing direction,
    at least an overflow tank that features an opening that lets out onto said build surface for removal of the powder from the build surface to the overflow tank,
    a reservoir intended for the powder that is used to create the successive powder layers,
    a transport unit to transport said powder upwards from the reservoir,
    scanning means to move said energy beam over the successive powder layers in the build chamber,
    wherein said apparatus works in combination with a module that is integrable into and removable from the build chamber, where the apparatus contains the transport unit and the scanning means, while said module contains the build platform, the overflow tank and the reservoir, wherein the module includes a powder chute under the reservoir, the powder chute is configured to receive the powder from the reservoir and extends along a longitudinal horizontal axis to a powder tank, the powder tank is configured to receive a lower end of the transport unit when the module is installed into the chamber, wherein the module includes a helical screw extending along the longitudinal axis of the powder chute, rotation of the helical screw transporting the powder to the powder tank.

2. The system according to claim 1, wherein said powder dispenser is located in the build chamber.

3. The system according to claim 1, wherein said module contains said powder dispenser.

4. The system according to claim 1, wherein said build platform extends above said reservoir.

5. The system according to claim 1, wherein a vertical projection of the build platform extends within a perimeter of a vertical projection of the reservoir.

6. The system according to claim 1, wherein said opening of the overflow tank extends at least over a width of the build platform transverse to said dispensing direction.

7. The system according to claim 1, wherein said overflow tank lets out onto said reservoir.

8. The system according to claim 1, wherein said overflow tank lets out onto said reservoir, via a closable opening, fitted with closing means.

9. The system according to claim 1, wherein said module contains a vertical tube with a top edge that extends into said build surface in which said platform is configured to be moved practically exactly into the tube between a start position, wherein the surface of the platform extends into said build surface or to a short distance below said build surface, and a final position located under the start position.

10. The system according to claim 9, wherein between said start position and said final position, and in the vicinity of the final position, said tube has at least an opening that lets out onto said reservoir and that enables the powder to flow from the tube to the reservoir.

11. The system according to claim 1, wherein said module contains a coupling that is connected to said platform and is configured to be connected to a drive means of said apparatus, wherein the drive means enable vertical movement of said platform via the coupling.

12. The system according to claim 11, wherein the module contains at least a vertical guide rail along which said coupling is configured to be moved.

13. The system according to claim 1, wherein said module contains an overflow groove, extending parallel to said dispensing direction, that lets out onto said build surface and is connected to the overflow tank.

14. The system according to claim 1, wherein said transport unit is provided to transport the powder from said reservoir to a screening device to separate the powder with a screen into a production fraction, which is suitable for the manufacture or said product, and a rejected fraction.

15. The system according to claim 14, wherein said screen is mounted over a hopper so that said production fraction is collected in the hopper.

16. The system according to claim 15, wherein the hopper is fitted with a dosing valve to move a controlled quantity of the powder from the hopper to the powder dispenser.

17. A module for use in an apparatus for layered manufacture of a three-dimensional product based on a powder, where the apparatus has a transport unit to transport said powder vertically and features a build chamber in which a powder dispenser is located for application of successive powder layers, while the apparatus also contains scanning means that enable movement of an energy beam in the build chamber over said successive powder layers,
    where the module must be placed in said build chamber of the apparatus and
    features a vertical tube with a top edge that extends into a horizontal build surface, where a vertically movable build platform is provided in the vertical tube,
    contains at least an overflow tank that features an opening that lets out onto said horizontal build surface for removal of the powder from the horizontal build surface to the overflow tank,
    contains a reservoir intended for the powder that is used to create said successive powder layers, where the reservoir extends under said platform and wherein the module includes a powder chute under the reservoir, the powder chute is configured to receive the powder from the reservoir and extends along a longitudinal horizontal axis to a powder tank, the powder tank is configured to receive a lower end of the transport unit when the module is installed into the chamber, wherein the module includes a helical screw extending along the longitudinal axis of the powder chute, rotation of the helical screw transporting the powder to the powder tank.

18. The module according to claim 17, wherein said build platform extends above said reservoir.

19. The module according to claim 18, wherein said overflow tank lets out onto said reservoir, via a closable opening, fitted with closing means.

20. The module according to claim 17, wherein a vertical projection of the build platform extends within a perimeter of a vertical projection of the reservoir.

21. The module according to claim 17, wherein said opening of the overflow tank extends at least over a width of the build platform.

22. The module according to claim 17, wherein said overflow tank lets out onto said reservoir.

23. The module according to claim 17, wherein said platform is configured to be moved practically exactly into said tube between a start position, where the surface of the platform extends into said horizontal build surface or to a short distance below the horizontal build surface, and a final position located under the start position.

24. The module according to claim 23, wherein between said start position and said final position, and in the vicinity of the final position, said tube has at least an opening that lets out onto said reservoir and that enables the powder to flow from the tube to the reservoir.

25. The module according to claim 23, with a coupling that is connected to said build platform, wherein the coupling is configured to be connected to drive means of said apparatus in order to enable movement of said platform on a vertical axis when the module is placed in said apparatus.

26. The module according to claim 25, with at least a vertical guide rail along which said coupling is configured to be moved.

27. The module according to claim 17, with an overflow groove that extends transverse to the opening of said overflow tank and is connected to the overflow tank.

* * * * *